No. 633,444. Patented Sept. 19, 1899.
A. E. FRISWELL.
RUBBER TIRE FOR VEHICLES.
(Application filed June 8, 1899.)
(No Model.)

WITNESSES:
Harry J. Gaveran
John D. Lynch

INVENTOR:
Arthur E. Friswell.
BY S. Schofield
ATT'Y.

UNITED STATES PATENT OFFICE.

ARTHUR E. FRISWELL, OF PROVIDENCE, RHODE ISLAND.

RUBBER TIRE FOR VEHICLES.

SPECIFICATION forming part of Letters Patent No. 633,444, dated September 19, 1899.

Application filed June 8, 1899. Serial No. 719,844. (No model.)

*To all whom it may concern:*

Be it known that I, ARTHUR E. FRISWELL, a citizen of the United States, residing at Providence, in the State of Rhode Island, have invented a new and useful Improvement in Rubber Tires for Carriages, of which the following is a specification.

My invention relates to improvements in rubber tires designed for use upon the wheels of vehicles; and it consists in the construction and combination of parts hereinafter described and claimed.

Figures 1, 2:
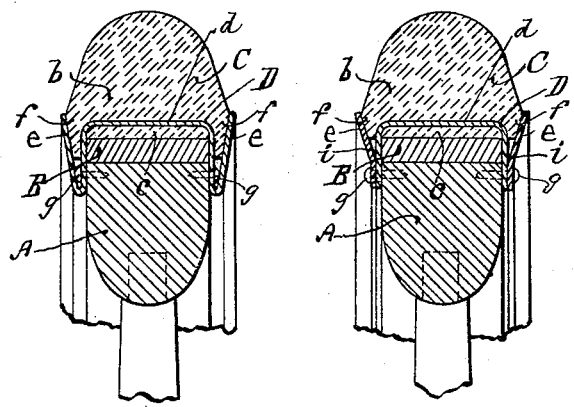
Figure 3:
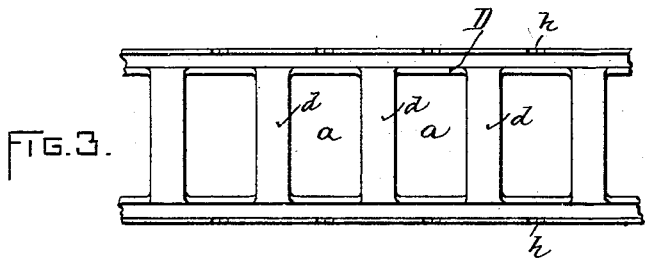
Figure 4:
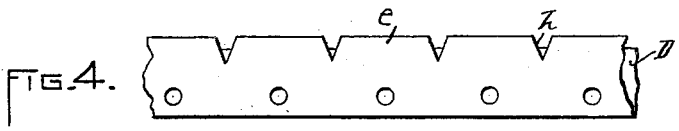
Figure 5:
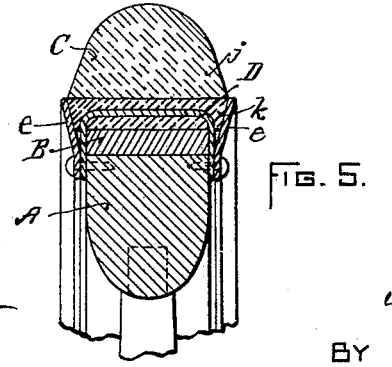

In the accompanying drawings, Figure 1 represents a transverse section of the rim of a carriage-wheel with my improved tire applied thereto. Fig. 2 represents a similar section showing a modified form of the metallic portion of the tire. Fig. 3 represents a plan view of the reinforcing metallic plate of the tire shown in Fig. 1. Fig. 4 represents a side view of the same. Fig. 5 represents a section similar to that shown in Figs. 1 and 2, showing a modification in the construction of the rubber portion of the tire.

In the drawings, Fig. 1, A represents the felly or rim of the wheel, and B the metallic tire of the same. C represents the rubber portion of my improved tire, which may be made in several sections or pieces, and D is the metallic reinforcing plate or segment, which by means of its flanges is adapted for attachment to the rim A of the wheel. The plate D is provided with the perforations *a a*, by means of which the outer portion *b* of the rubber will be connected with the inner portion *c* and be firmly retained by means of the embedded metallic bars *d d* of the plate D, the opposite edge portions of the said plate being turned backward to fit the edges of the metallic tire B and the sides of the rim A and then outward to form supporting-flanges *e e* for the edges *f f* of the rubber portion C of the tire. The several metallic plates or segments D when bent to the proper curve to fit the periphery of the tire B of the wheel are secured to the sides of the rim A by means of the screws *g g*, and when so attached the flanges *e e* will prevent the edges *f f* of the tire C from spreading or working loose from the bars *d d* when the tire is subjected to pressure, the said edges *f f* being made to extend outward to the outer edge of the flanges *e e*, as shown in the drawings. By providing the flanges *e e* with the notches *h h*, made opposite the perforations *a a*, the bending of the plate D to the proper curved form will be facilitated.

A modification of my invention is shown in Fig. 2, in which the reinforcing metallic plate D is formed in three parts instead of being integral, as in Fig. 1, the flanges *e e* being formed separately and attached to the backwardly-turned flanges *i i* of the perforated central portion of the plate D, and in this case the flanges *e e* may be stamped out to the proper curve of the wheel without subsequent bending, as required in the form shown in Fig. 1, the composite reinforcing plate or segment D being secured to the felly or rim A of the wheel by means of the screws *g g*.

A preferable construction of the rubber portion C is shown in Fig. 5, in which the plate D is shown as made in three parts, as in Fig. 2, and the rubber portion C made in two parts *j* and *k*, the outer part *j* being made of soft rubber and the inner part *k* of comparatively hard rubber, the part *k* being first partially vulcanized upon both sides of the perforated reinforcing-plate D and then having the outer part *j* cemented thereto for subsequent complete vulcanization, whereby the rubber of the attaching portion *k* will be of a harder nature than that of outer portion *j*, thus forming a rubber tire having desirable qualities of elasticity, strength, and durability, that portion of the tire which is beyond the edges of the flanges *e e* and capable of yielding being made of soft rubber, while that portion of the tire which is within the said flanges and therefore incapable of changing its form is made of hard rubber, and when the tire is so made in hard and soft portions the outer flanges *e e* may be dispensed with in carrying out my improvement, the hard rubber sufficing to hold the connected soft rubber in place; but I prefer to employ the said outer flanges.

The hard rubber when employed in contact with the metallic plate D and vulcanized thereto has an affinity for the metal owing to the nature of the composition of which the hard rubber is formed, and the inner hard rubber combined with the outer soft rubber constitutes a great improvement in rubber tires for carriages.

I claim as my invention—

1. A rubber tire composed of sections or pieces, having embedded therein a reinforcing-plate, provided with central perforations and with backwardly and outwardly turned edges, adapted to fit the sides of the rim of the wheel, and support the edges of the rubber tire, substantially as described.

2. A rubber tire, composed of sections or pieces, having embedded therein a reinforcing-plate provided with central perforations and backwardly-turned edges adapted to fit the sides of the rim of the wheel, and with the separately-formed outwardly-extending flanges secured to the backwardly-turned edges of the reinforcing-plate, substantially as described.

3. A rubber tire composed of sections or pieces, and having a soft-rubber outer portion, and a hard-rubber inner portion with a perforated reinforcing-plate embedded in the hard-rubber portion and provided with backwardly and outwardly turned edges adapted to fit the sides of the rim of the wheel, and support the edges of the rubber tire, substantially as described.

4. A rubber tire composed of sections or pieces, and having a soft-rubber outer portion and a hard-rubber inner portion, with a perforated reinforcing-plate embedded in the hard-rubber portion, the said plate being provided with a flange which extends outwardly beyond the surface of the perforated plate, to the junction of the hard-rubber with the soft-rubber portion, substantially as described.

ARTHUR E. FRISWELL.

Witnesses:
SOCRATES SCHOLFIELD,
JOHN S. LYNCH.